United States Patent [19]
Husky et al.

[11] 3,904,725
[45] Sept. 9, 1975

[54] QUENCHING MOLTEN THERMOPLASTIC FILM

[75] Inventors: C. George Husky; Charles J. Resler, Jr.; Sidney C. Sanders, all of Circleville, Ohio

[73] Assignee: E. I. Du Pont de Nemours and Company, Wilmington, Del.

[22] Filed: May 14, 1973

[21] Appl. No.: 360,002

Related U.S. Application Data

[62] Division of Ser. No. 232,763, March 8, 1972, Pat. No. 3,779,682.

[52] U.S. Cl. .................. 264/89; 264/22; 264/216; 264/DIG. 45
[51] Int. Cl.² .................. B29C 25/00; B29D 7/08
[58] Field of Search ......... 264/22, 216; 425/174.8 E

[56] References Cited
UNITED STATES PATENTS
3,277,227  10/1966  Kesseler et al. .................. 264/216

FOREIGN PATENTS OR APPLICATIONS
848,852  8/1970  Canada .................. 264/216

Primary Examiner—Robert F. White
Assistant Examiner—Gene Auville

[57] ABSTRACT

In the casting of molten thermoplastic film onto a moving quenching surface and pinning the edges of the film to the quenching surface an improvement is realized by applying additional pinning force to the edge portions of the extruded film to prevent localized thinning of the film.

3 Claims, 4 Drawing Figures

FIG.3
FIG.4
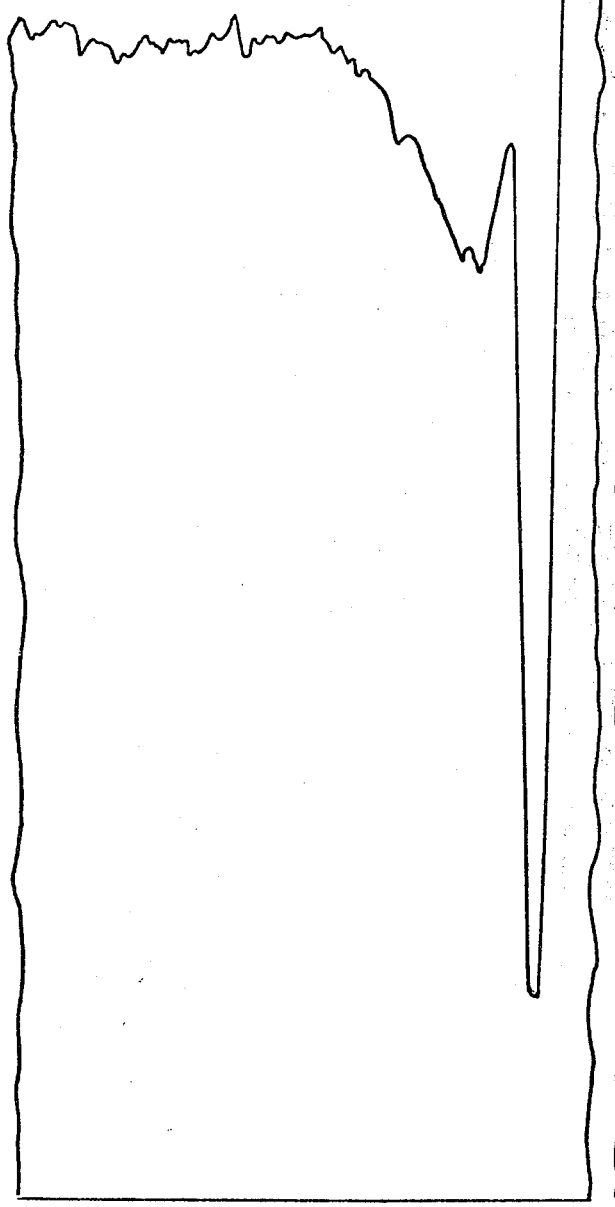
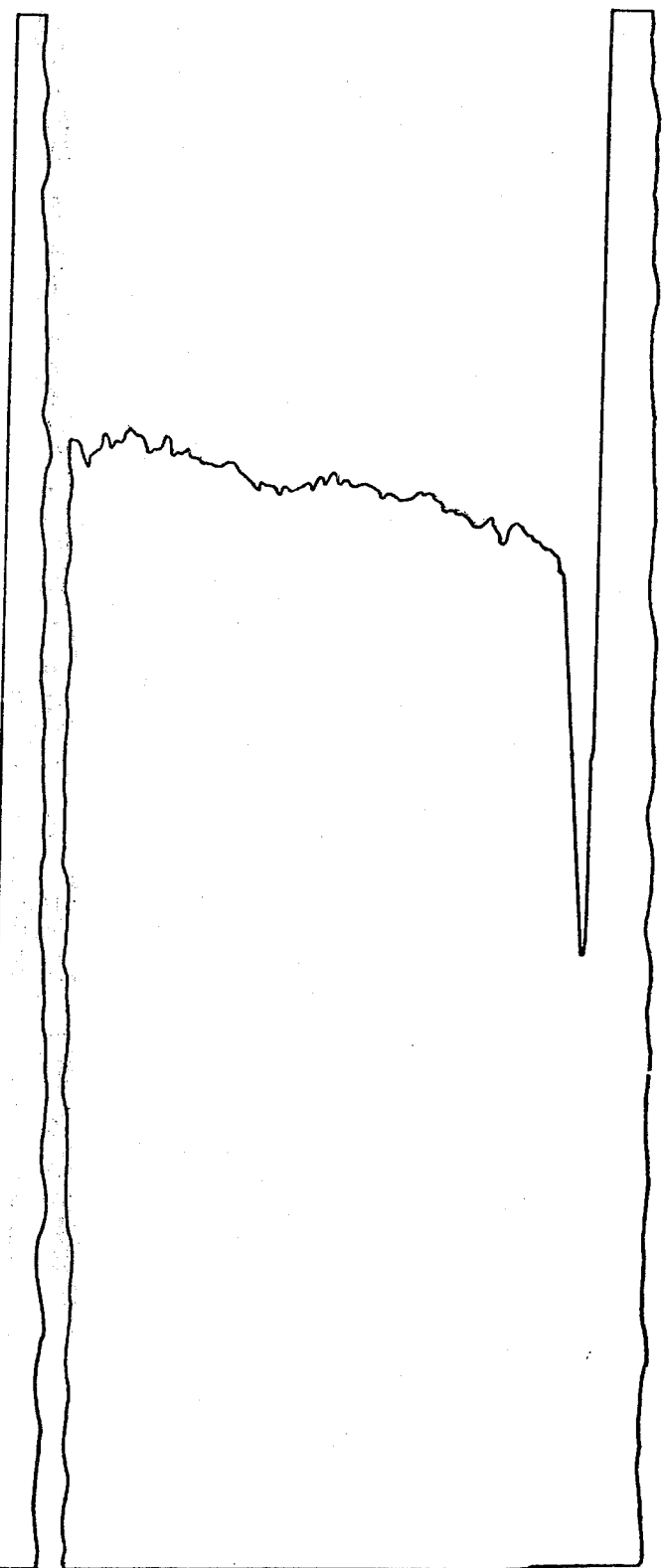

QUENCHING MOLTEN THERMOPLASTIC FILM

This is a division of application Ser. No. 232,763, filed March 8, 1972 now U.S. Pat. No. 3,779,682.

BACKGROUND OF THE INVENTION

Conventional methods of preparing thermoplastic polymeric film include casting a sheet of molten polymer through a slit die onto a cooled quenching surface to stabilize and solidify the film. It is desirable in such processes to stabilize the edges of the freshly extruded film to minimize width loss and width irregularity due to shrinkage. One of the most effective means of edge control is electrostatic point probes directed toward each lateral edge of the freshly extruded film, the electrostatic probes forcing the film edges into intimate contact with the quenching surface and preventing lateral movement of the film.

While edge pinning has provided an effective means for stabilizing the width of freshly extruded film, the immobilization of the edges of the film has presented other problems in obtaining thickness uniformity. Specifically, pinning of the edges of a freshly cast film, in combination with the tendency of the film to shrink during cooling, causes a thinning of the film in the area immediately adjacent the pinned edge. This thinned portion not only increases waste due to edge trim, but its weakness can cause breakage and disruption of the transverse orientation process in which the edges of the film are gripped for lateral stretching.

SUMMARY OF THE INVENTION

The present invention provides an improved process which not only alleviates the problem of thinning of a cast film immediately adjacent the pinned edges, but permits taking full advantage of other pinning apparatus available to the art.

Specifically, the instant invention provides an improvement in process for quenching molten thermoplastic film in an apparatus comprising a movable quenching surface, an extrusion die positioned above the quenching surface to extrude a polymeric film from the die onto the quenching surface and lateral point pinning means positioned above the quenching surface and over each lateral edge of the film, which improvement comprises means for directing additional pinning force onto the surface of the film at least over the areas of the extruded film inward from each lateral pinned edge and having the highest temperature, to minimize localized thinning of the film.

In a particularly preferred process embodiment of the invention, the apparatus further comprises a bearing positioned between the extrusion die and the normal touchdown point of a polymeric film extruded from the die onto the quenching surface; means for providing a layer of fluid on the surface of the bearing; and a pressure box for applying a uniform field of air pressure onto the surface of the polymeric film after its touchdown onto the quenching surface.

The invention further provides an improvement in the process for quenching molten thermoplastic film by extruding the film onto a quenching surface and pinning each lateral edge of the film to the quenching surface, which improvement comprises directing additional pinning force onto the surface of the film at least over the areas of the extruded film inward from each lateral pinned edge and having the highest temperature, to prevent localized thinning of the film.

BRIEF DESCRIPTION OF THE DRAWINGS

FIGS. 3 and 4 are cross sectional views of films having been pinned using electrostatic edge probes, FIG. 4 additionally having been pinned using the process of the present invention.

DETAILED DESCRIPTION OF THE INVENTION

Figure 1:
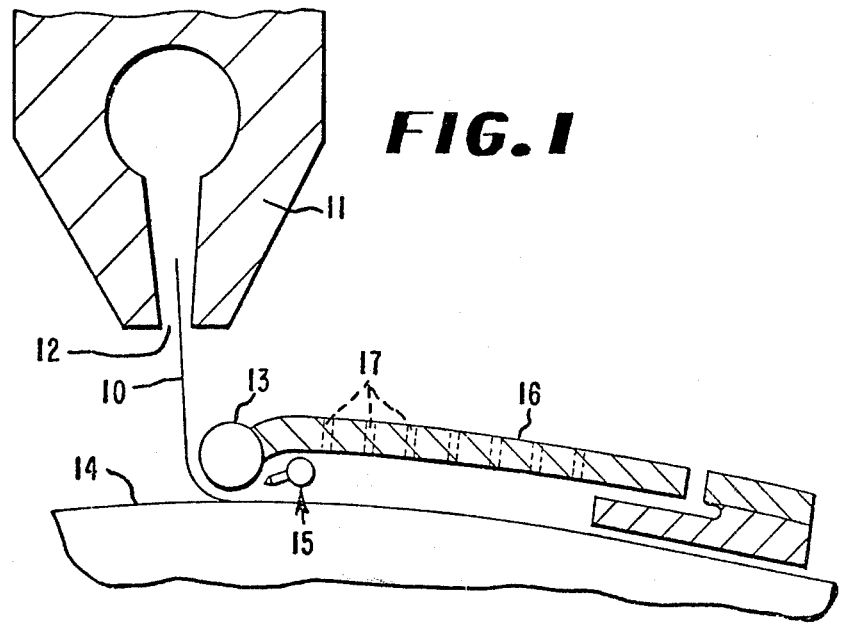
FIG. 1 is a cross sectional illustration of an apparatus that can be used in the instant invention.

In the preparation of thermoplastic polymeric film using a flat extrusion process, a molten web is cast onto a cool quenching surface. Although the molten sheet may be substantially uniform in thickness as it issues from the parallel die lips, tension on the free span between the die and the quenching surface causes a contraction in the width of the film which results in a greatly increased thickness at the edges of the film. Once on the quenching surface, the contraction of the web continues through the cooling process. However, when edge pinning means are used to stabilize the film width, a marked thinning occurs in the film adjacent the pinned edge. This thinning results from the use of any conventional edge pinning apparatus, including, for example, electrostatic point probes and air jets.

While the mechanism that results in these thinned areas of the film edges is not fully understood, it is believed to be due to the combined effects of immobilizing the edges of the film and the natural tendency of the film to shrink. It is recognized that as the film cools across its width, shrinkage occurs. With the edges substantially immobilized, the shrinking force causes stretching at the weakest portion of the film that is free to move. That portion of the thickened edge not immobilized by the edge pinner has the highest temperature of the non-immobilized part of the film, since the greater thickness takes longer to cool. The high temperature portion of the film is weakest and will stretch transversely to allow shrinkage of the remainder of the sheet. This local stretching results in a rapid and extreme thinning of the film immediately adjacent that thick portion immobilized by the point pinning means.

This problem is particularly acute when a combination of different pinning apparatus is used, such as that described in the copending application of Heyer, Ser. No. 23,390, now abandoned, and in copending continuation-in-part applications thereof, Ser. Nos. 232,764, filed Mar. 8, 1972, now abandoned, and 232,765, filed Mar. 8, 1972, now U.S. Pat. No. 3,795,474 assigned to the same assignee as the present application. Using the apparatus described therein, the edge portions of the film exhibit marked and repeated fluctuations in thickness, presumably due to the increased quenching efficiency of the pressure box described therein. The repeated fluctuations in thickness are not fully understood, but are believed to be a function of the deeper thinning that occurs with the increased cooling efficiency of the pressure box. This deep thinning is halted by rapid cooling as the affected area becomes markedly thinner and cooler than the adjoining area. Then, another adjoining area, which is still thick and hot, begins thinning to allow for continued shrinkage of the bulk of the film. The remaining portion of the high temperature, tractable mass is repeatedly subjected to this sequence, resulting in a cross-section such as that illustrated in FIG. 3.

The present invention is based on the discovery that the direction of additional pinning force at that portion of the lateral edge of the film that is mobile and characterized by the highest temperature permits the preparation of films that do not exhibit as great a thinning as was previously experienced. In addition, the present invention permits using the increased quenching efficiency of the Heyer apparatus previously described, but without the attendant disadvantage of the marked fluctuations in thickness adjacent the edge. It is believed that these additional pinning means serve to increase the rate of cooling of the higher temperature edge portion of the film so that the high temperature polymer is cooled to an intractable state at a greater thickness.

In accordance with this discovery, the additional pinning means are preferably arranged at least over an area beginning at the point at which the edges of the film are pinned to the quenching surface, and extending diagonally over that thickened portion of the edge of the cast film not immobilized by the edge pinning means and characterized by the highest temperature. The diagonal pattern will be determined by the movement of this high temperature portion toward the center of the sheet as it is transversely stretched to accommodate the shrinking of the film. However, in addition to these diagonal pinning means, additional pinning means can be positioned along the lateral edge and in the area between the edge and the diverging diagonal to further assist in the complete cooling of the film.

Pinning means that can be used in the present invention include, for example, electrostatic point probes or air jets. Alternatively, a single air knife or electrostatic wire pinner can be positioned along the edge of the film in a similar diagonal direction over that portion of the edge bead having the highest temperature. It has been found particularly convenient to provide in a uniform air pressure box of the Heyer apparatus a series of vernier jets arranged in a pattern that provides the requisite increased pinning force by a field of air pressure. In order to provide the requisite pressure field, the air jets should generally be placed no more than about 0.6 centimeters apart, transversely. While the air pressure provided through the jets will necessarily vary with the thickness of the extruded web, the width of the web, and the speed of travel of the web and the drum, it has been found that the benefits of the invention are obtained when an air pressure of about 50 millimeters of mercury is provided through the jets. When electrostatic point pinners are used in the instant invention, the spacing and voltage applied should similarly be adjusted to apply a substantially uniform force to the required edge area of the cooling film.

Figure 2:
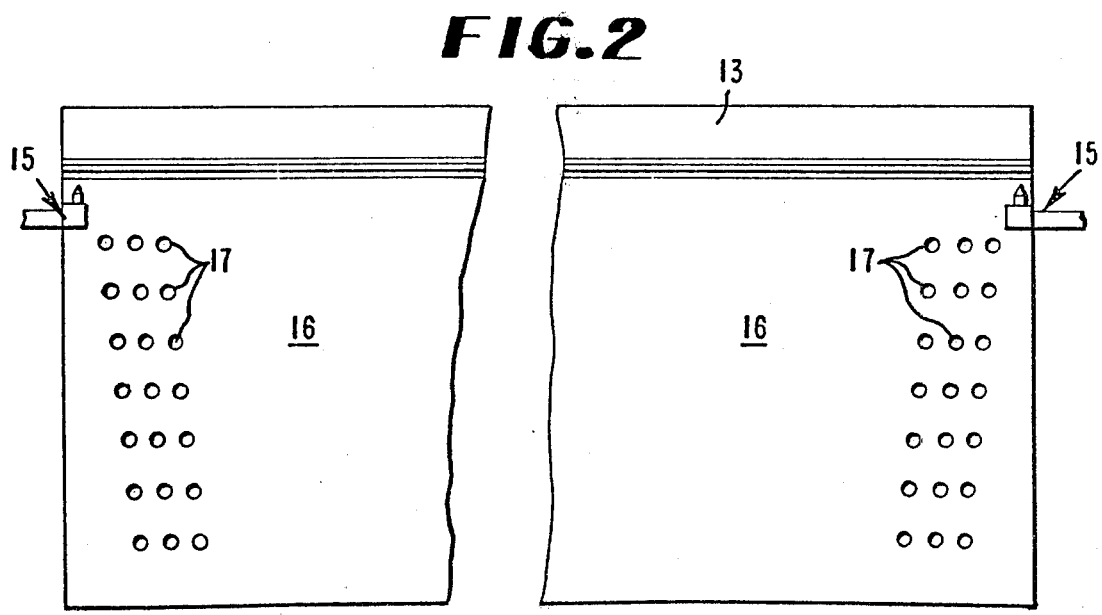
FIG. 2 is a top planar view of an apparatus that can be used in the instant invention.

FIG. 1 is a cross sectional illustration of a representative preferred apparatus that can be used in the present invention. In that figure, thermoplastic web 10 is extruded from extrusion die 11 through orifice 12 formed in the extrusion die. The film is extruded over porous bearing 13 onto the surface of the quench drum 14, where it is brought into more intimate contact with the quenching surface by electrostatic point probes 15 as well as the air pressure supplied through pressure box 16. Vernier air jets 17 are positioned along the lateral edges of the film in an area extending inwardly on a diagonal path from the edge of the film. This area is shown more clearly in FIG. 2, in which the air jets extend from initial edge pinning points on the edges of the film inwardly along diagonal coordinates. As can be seen from the figure, this embodiment utilizes a pattern of three rows of air jets to completely cover the high temperature edge mass as it progresses inwardly.

The effect of the present invention is most clearly illustrated by FIGS. 3 and 4. FIG. 4 is a representative cross-sectional view of a film prepared in accordance with the present invention while FIG. 3 represents a typical film made using pinning apparatus identical to that of the present invention except that the multiple point pinning means are omitted. As can be seen from the figures, the edge portion of the film having been pinned according to the present invention is relatively smooth. By contrast, if the multiple point pinners are removed from the apparatus, the resulting film will have a cross-section similar to that of FIG. 3. In that figure, the edge thickness profile shows several very thin areas, extending far from the edge of the film, thus decreasing the amount of useable film and providing sites for breakage during transverse stretching.

The present invention is applicable in the pinning of thermoplastic films generally, including, for example, polyesters such as polyethylene terephthalate, polyolefins such as polyethylenes and polypropylenes, and polycarbonates such as phosgene-bisphenol (A) condensation products. However, it will be readily recognized that the benefits of the invention, that is, the increased uniformity of the lateral edges of an extruded film, will be most fully realized with those polymers having a high rate and degree of contraction on cooling, for which reason polyesters, and particularly polyethylene terephthalate, are preferred for application of the invention.

We claim;

1. In a process for quenching molten thermoplastic film by extruding the film onto a quenching surface and pinning each lateral edge of the film to the quenching surface, the improvement which comprises directing additional pinning force in a diagonal pattern beginning at the point at which the edges are pinned and extending in the direction of the film travel on the surface of the film at least over the thickened areas of the edge of the extruded film inward from each lateral pinned edge that are mobile and characterized by the highest temperature, such diagonal pattern on such film surface being determined by the movement of the thickened areas toward the center of the film as such thickened areas are transversely stretched to accommodate the shrinking of the film.

2. The process of claim 1 including the step of applying a uniform field of air pressure onto the surface of the film after its touchdown onto the quenching surface.

3. The process of claim 2 wherein the means for directing such additional pinning force are vernier air jets.

* * * * *